(12) United States Patent
Clark et al.

(10) Patent No.: US 6,496,359 B2
(45) Date of Patent: Dec. 17, 2002

(54) TILE ARRAY COMPUTERS

(75) Inventors: Wesley A. Clark, Brooklyn, NY (US); Ivan E. Sutherland, Santa Monica, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/733,241

(22) Filed: Dec. 8, 2000

(65) Prior Publication Data

US 2002/0071247 A1 Jun. 13, 2002

(51) Int. Cl.$^7$ ................................................ G06F 1/16
(52) U.S. Cl. ...................... 361/681; 345/204; 345/205; 345/206

(58) Field of Search ................................. 345/204–206

(56) References Cited

U.S. PATENT DOCUMENTS 6,252,564 B1 * 6/2001 Albert et al. .................. 345/1

* cited by examiner

*Primary Examiner*—Lynn D. Feild
*Assistant Examiner*—Yean Hsi Chang
(74) *Attorney, Agent, or Firm*—Townsend and Townsend and Crew LLP (57) ABSTRACT

A tile array computer is disclosed. A tile array computer is formed by individual tiles, each typically containing a display surface, a processor, memory, and communication devices for providing communications with adjoining tiles or the support structure upon which the tiles are placed.

19 Claims, 7 Drawing Sheets

TILE ARRAY COMPUTERS

BACKGROUND OF THE INVENTION

This invention relates to computing systems, and in particular, to computers in which primarily identical modules, each containing a display, processor, memory and communications devices, are combined in arrays by the user to simultaneously provide increasing amounts of computing power and display area in modular increments.

Of the numerous components of present personal computers or other computer systems designed for individual access, the user typically interacts directly with only the display monitor and keyboard/mouse. These components alone, and especially the display, understandably may come to be regarded as the true computer, with the remaining, less prominent components—processor, memory, disk drives, and so on—being relegated to the background role of "engine"; that is, necessary hardware that makes the "true" computer perform properly when given a suitable program. From this perspective, a more capable computer is one that offers a larger display as well as greater computing power, either or both of which are advantageous in many fields of application. In personal computers, as well as in computers used in other settings, a separate enclosure typically has been provided to hold the less prominent components and related subsystems. This enclosure is often placed in a relatively distant location; for example, in a remote server, under the user's desk or elsewhere.

Remarkable improvements in technology have permitted the computer's "engine" to be manufactured in sizes small enough to fit beneath the keyboard, as in a laptop computer, or beneath the display screen, as in some hand-held devices. Such products, however, still suffer from the disadvantage that adding significant processing power to the computer, or increasing the size of the display, is essentially impossible. To obtain such additional processing power or larger display the user typically must purchase a new computer and/or new display monitor to supplement or replace his existing equipment.

SUMMARY OF THE INVENTION

This invention describes programmable computers that are composed primarily of arrays of one or more typically identical tiles, each of which typically provides the functions of both computing and display. In a preferred embodiment, these computer tiles are typically square or rectangular in shape and relatively thin, and within each tile are typically found a programmable processor, memory, communication signal transducers, and a structure for receiving or adapting power for use within the tile. An "upper" surface of the tile typically consists of a desired type of display device for producing a visible display of textual, graphical, and pictorial material. Each tile preferably also includes strain-gauge devices that produce electrical signals in response to pressure applied on the display surface, thus making the tile touch sensitive.

In the following we refer to such computers as tile array computers, or just tile arrays. Tile arrays are typically assembled for use on a supporting panel consisting of a framed mounting plate which may also provide electrical power to individual tiles. The supporting panel also includes signal transducers for communication with mounted tile arrays, and may further be connected to a separate server that provides additional operational functions. Each tile can be programmed to act cooperatively with adjoining tiles when mounted in an array on the supporting panel. In a preferred embodiment, communication signals between adjoining mounted tiles, and between the panel and mounted tile arrays, are carried on optical (for example, infrared) signal pathways via the signal transducers. These optical signals are transmitted through windows in the edge and "lower" surfaces of each tile as well as through windows in corresponding locations on the supporting panel. When the tile arrays occupy cellular positions on the mounting plate, the tile-to-tile and panel-to-tile communication windows in one tile are aligned with like windows in adjoining tiles and in the supporting panel. Within each tile, signals to and from both its memory and its communication signal transducers, as well as signals from its strain-gauge devices, are coupled to the processor and are interpreted and coordinated by the program. Primarily in response to these signals, the program generates and delivers information from the processor and/or memory to the tile's display.

Each distinguishable panel-mounted tile array thus constitutes a distinct and programmable tile array (multi-) computer whose display area and potential computing power both increase modularly with the number of tiles in the array. The panel is preferably designed to hold as many intercommunicating tile array computers, each of appropriate capability, as may be desired for a designated range of applications.

In one embodiment, a computer tile according to the invention includes a display surface having elements thereon for displaying images, the display surface being affixed to a substrate having a predefined shape and a processing element coupled to the display, coupled to a memory element, and coupled to an information transducer element, each of the processor element and the memory element being mounted on the substrate to enable the processor to communicate with the display surface to control the presentation of information thereon, wherein the transducer element is disposed to permit communications between the processor element and an external receiver or transmitter through a region of the tile other than the display surface.

BRIEF DESCRIPTION OF THE DRAWINGS

FIG. 4 illustrates the preferred functional structure of the tile, with FIG. 4a illustrating a cross section and FIGS. 4b, 4c and 4d illustrating plan views at different functional levels of the tile;

DESCRIPTION OF THE SPECIFIC EMBODIMENTS

The system described provides a computing system stemming from three premises: First, that the display screen is the computer's predominant component; what we think of as a computer today is often primarily the display device that presents the computer's output to us. Second, more display is seldom enough; people are accustomed to working at desks limited in size only by the length of the human arm, and constraining the workspace or "desktop" to a single small screen is often inappropriate. Third, providing for incremental upgrade is desirable; users should more easily be able to add to existing systems than replace them.

FIG. 1 is a series of views of a tile array computer according to one embodiment of the invention. A Tile Array Computer (TAC) offers computing in relatively small increments, each associated with a section of display. FIG. 1a illustrates the basic unit of the system, a "tile" 10, typically on the order of 3 to 6 inches square and an inch or less thick, although as will be evident, tiles of other sizes and shapes are also possible. Preferably, each such tile 10 has a "flat panel" display 12 on its upper surface (for example, a liquid crystal display, plasma display or other type) and also has force, capacitive, or other sensors built into it to make it touch sensitive. Each tile contains programmable computing components, memory, and other devices (as described below) to permit inter-tile communication. An array 15 of such tiles forms a Tile Array Computer as illustrated in FIG. 1b, although a TAC may also consist of a single tile as in FIG. 1a.

Figure 1A:
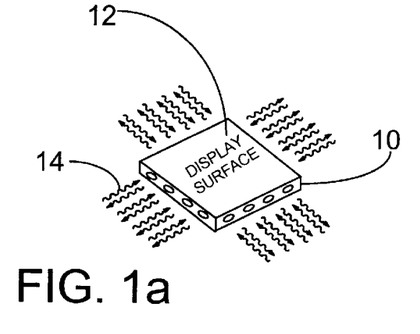
FIGS. 1a, 1b, 1c and 1d illustrate different views of a tile array computer and its elements according to a preferred embodiment.
Figure 1B:
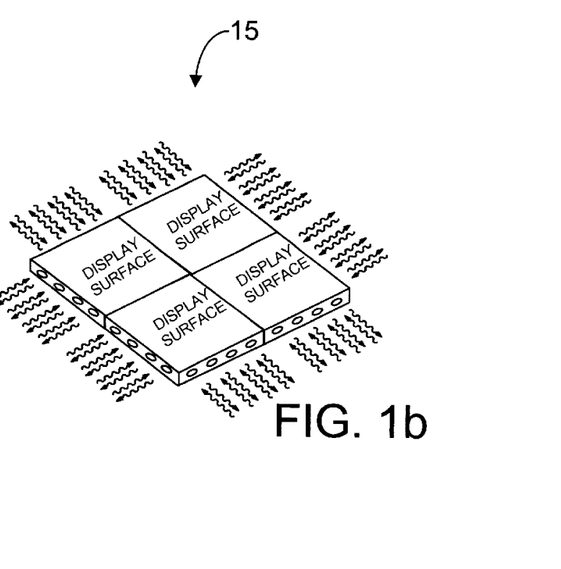

FIGS. 1a and 1b also illustrate the use of optical communication paths 14 between the tiles making up a TAC. Each tile 10 includes a transducer or other suitable technology at its edges for converting signals, typically from voltage to infrared and back again. Signals on these paths enable tiles in array 15 to exchange information and to act in concert.

A feature of the display surface of each tile 10 is its ability to present image material that covers the tile surface as completely as manufacturing processes permit. A group of tiles arranged in an array such as shown in FIG. 1b thereby presents a uniform display surface, essentially all of which can be used to present text, graphics, or other image material. Thin marginal discontinuities may be inevitable, although in some embodiments they will be imperceptible or nearly so. Experience with multi-screen TV suggests that, in some embodiments, advantages may derive from the existence of such "natural" boundaries for some display presentations.

Figure 1C:
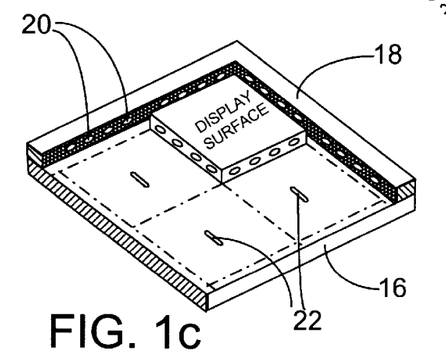

In the embodiment described herein, a mounting plate 16 consisting of framed plate 18 supports the tiles, as shown in FIG. 1c. Plate 16 provides electrical power to mounted tiles and serves as the termination of communication cables or other connector that connect mounted TACs to peripheral devices and/or network. Plate 16 includes signal transducers for communication with mounted tiles through panel-cell transducer windows 22 aligned with like windows in the lower surface of each tile. Frame 18 retains tile 10 in position, although other retention devices can be used. Frame 18 also includes signal transducers for communication with the tile 10 through frame transducer windows 20. In other embodiments the TAC might not require a mounting panel; tiles would be designed to interlock mechanically to form rigid structures. Specialized tiles built in the same shape as the tiles illustrated can be connected by a suitable cable to a source of electrical power for distribution throughout the tile array, via tile-to-tile connectors, and would communicate with other equipment via cable or other communication device.

Figure 1D:
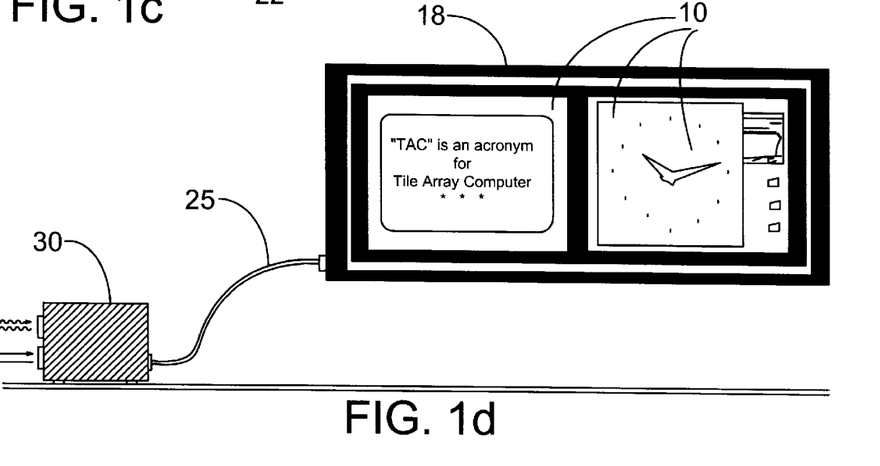

FIG. 1d illustrates a typical assembly for a preferred embodiment of a Tile Array Computer. As shown therein, the mounting panel is connected via cable 25 to an external communications device, for example, server 30. For the embodiment depicted in FIG. 1d, two rows of five tiles each are depicted. Each tile being approximately 6 inches square, the overall display area is on the order of that provided by two 19-inch conventional CRT monitors. The black area in FIG. 1d represents area of the tiles where display surface pixels are not illuminated.

Because each tile preferably includes its own programmable computing devices and memory, enlarging the size of the display area by increasing the number of tiles in the array also increases the computing power of the system. Similarly, augmenting the computing power by adding tiles automatically provides additional display area. Larger systems thus provide not only greater computing power, but also a larger display surface. The anticipated low cost and relatively small size of tiles thus permits incremental upgrade of Tile Array Computers in both processing power and display area.

Figure 2:
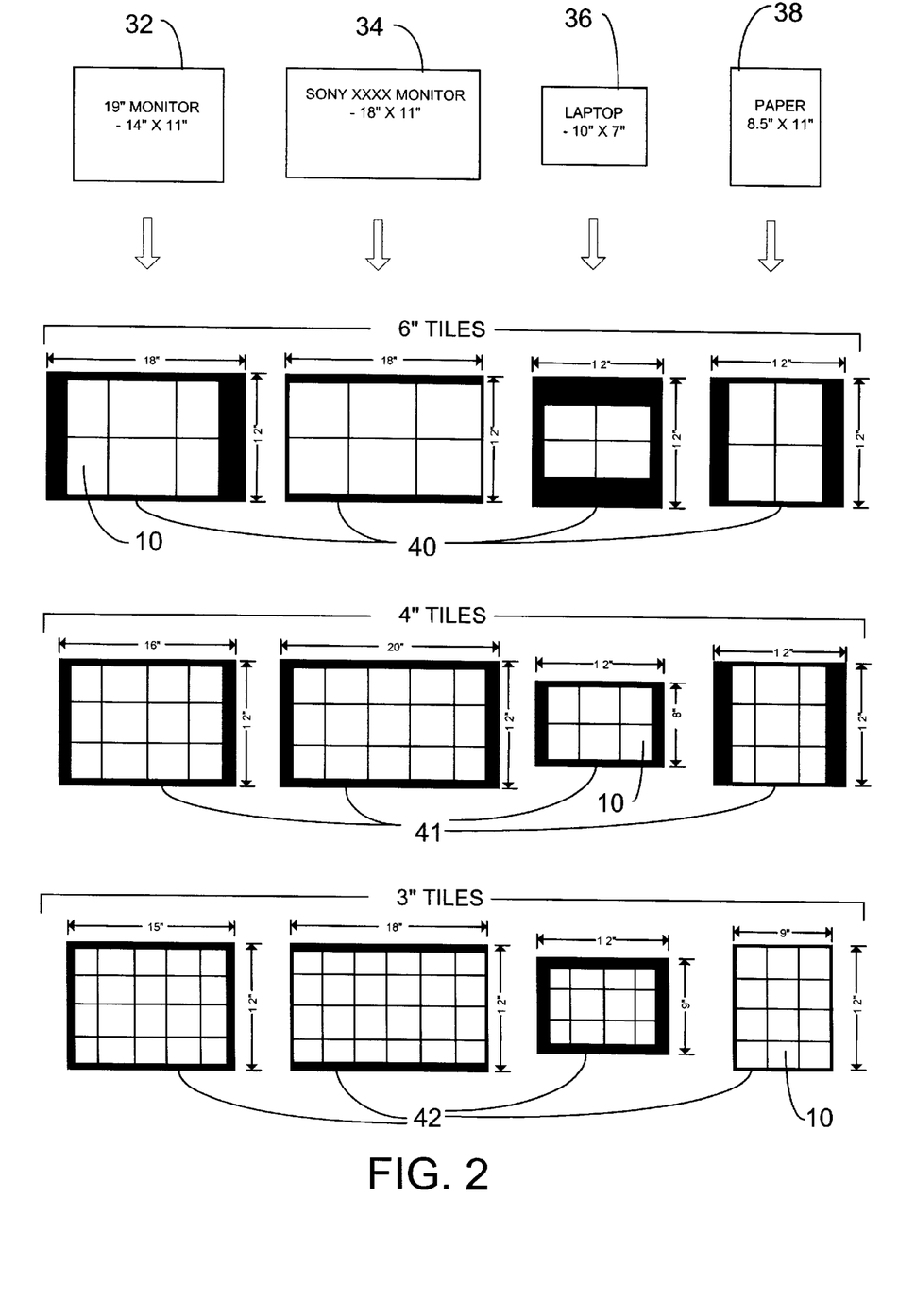
FIG. 2 illustrates the area coverage of various common display media by tile arrays of different sizes.

FIG. 2 illustrates the coverage offered by arrays of different sized tiles. A few six inch tiles provide large area coverage, while smaller tiles make possible a greater variety of array sizes with efficient coverage. In FIG. 2 the columns represent various sizes of typical media: a 19-inch monitor 32, an HDTV format monitor 34, a laptop computer 36, and a sheet of paper of common size 38. The rows in the figure depict, for given sizes of tiles 10, how the various display formats may be achieved. (The dark areas in FIG. 2 represent portions of the tile display area of the tiles which are "turned off.") For example, a laptop display 36 can be accommodated with six 4-inch tiles as shown in the third column of the second row.

Figure 3A:
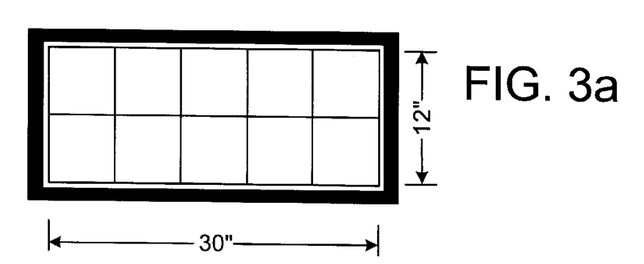
FIGS. 3a–3c illustrate arrangements of panel-mounted multiple tile-array computers in a variety of possible configurations.
Figure 3B:
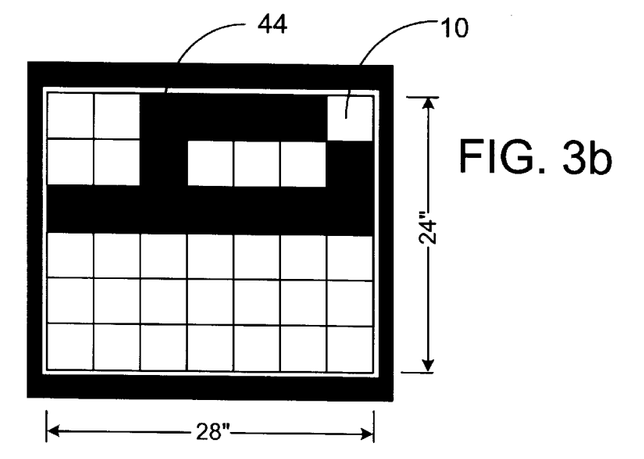
Figure 3C:
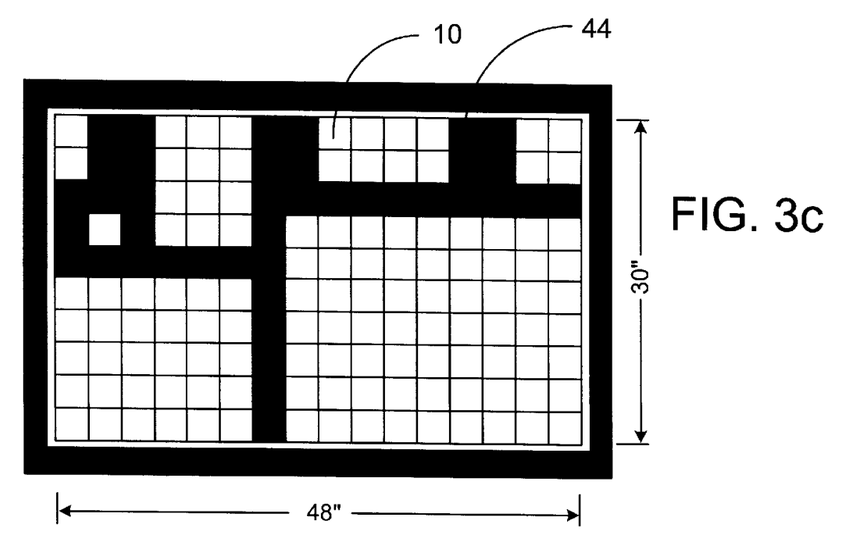

FIGS. 3a–3c illustrate some arrangements of panel-mounted tiles. As shown in FIG. 3a, the "double headed" monitor, common in various research laboratories and elsewhere, requires a single TAC consisting of 10 tiles of the six-inch size mounted in a 2×5-cell panel. FIGS. 3b and 3c illustrate some larger panel arrangements of multiple TACs.

FIGS. 3b and 3c contemplate TAC systems in which some tiles 10 have display surfaces while others, termed filler tiles, do not. The provision of such filler tiles 44 is largely an economic issue, since it is possible to render dark a tile that is capable of displaying images, although it might be more costly to do so. Filler tiles 44, shown dark in FIG. 3, naturally divide the panel's presentation into separate areas that may be devoted to separate purposes. Such tiles may or may not be touch sensitive.

The seven distinguishable TACs shown in FIG. 3c, for example, may each serve their user in a different manner. The user might devote one to displaying the face of a clock, another to telephone directory service, yet another to an editing task, another to the user's daily meeting schedule, and still another to a TV presentation, and so on. How such TACs are used, of course, is a matter of user choice and the programs carried inside the TAC tiles involved. Despite their separation, the multiple TACs provide a greater overall surface on which to display useful information. It will still be possible, of course, to overlay "windows" in each display area as is commonly done on today's relatively small display surfaces. Indeed, experience with papers on a desk suggests that no matter how large the surface, overlaying will still prove useful.

Other specialized tiles can also be provided For example, a tile with a built-in microphone or loudspeaker can communicate with a user via sound, although such components might better be provided elsewhere. A tile containing a small disk drive or other mass storage device, can provide memory backup or provide for input of information from disks or other media. Such specialized tiles provide special functions in addition to, or instead of, the display function of the tiles comprising a TAC.

In some embodiments it may be useful to employ tiles of different sizes but with dimensions that are multiples of a standard unit. For example, if the smallest tile is four inches square, rectangular tiles of twice the area, namely four by eight inches in size, would also fit compatibly into an array along with the smallest tiles, as would tiles eight by eight inches square. Tiles need not be identical in size provided they fit into arrays as desired.

Square or rectangular tiles simplify the design of the mounting panel, but tiles of other shape, for example hexagonal, can be defined as well. In any case, each tile will generally have a high resolution display that extends as closely as possible to the edges of the tile. Other size variations may also be employed. Yield considerations suggest that relatively smaller tiles might may be less costly per unit area, although a larger proportion of tile edges might detract from their utility in some applications. For example, an array of very small tiles may present a display surface on which is superimposed a relatively thick grid of tile-edge discontinuities. Useful bodies of text required in some applications might then become difficult to read unless displayed entirely on single tiles rather than straddling tile boundaries, and this may establish a minimum usable tile-size. Of course, if display discontinuities can be made essentially invisible, any size limitation based on such discontinuities disappears as well.

Figure 4A:
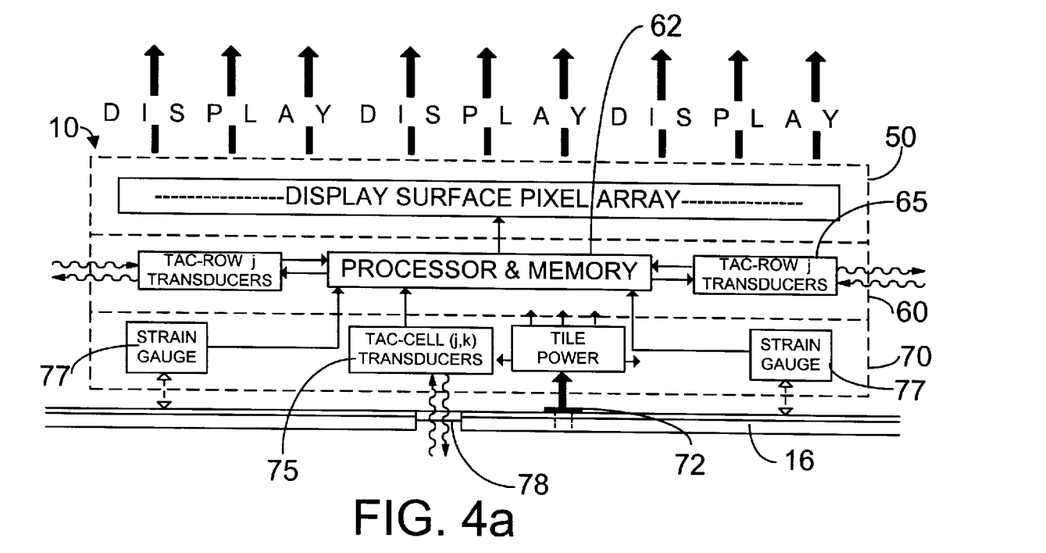
Figure 4B:
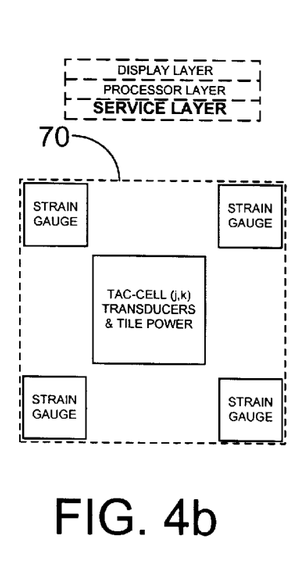
Figure 4C:
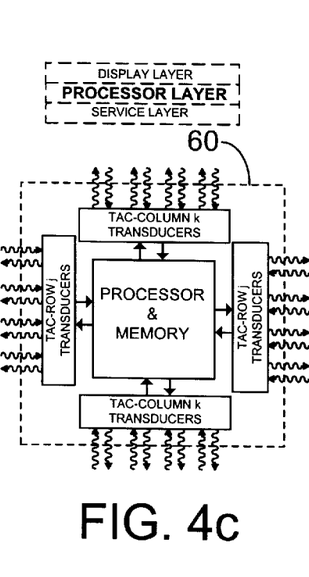
Figure 4D:
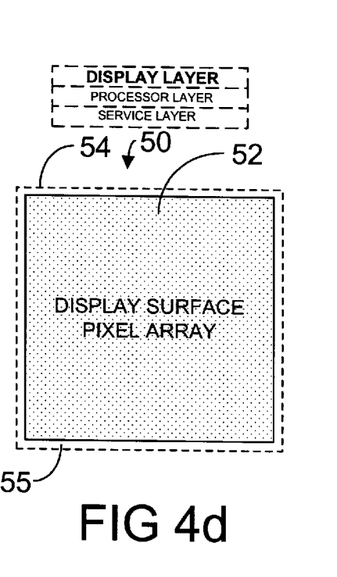

FIGS. 4a–4d illustrate in more detail the functional structure of tile 10 in the preferred embodiment. For convenience in description, the sub-elements of a TAC tile, are represented in three functional layers 50, 60 and 70 as shown in FIG. 4a. (In all figures, dotted lines enclosing sub-element groupings distinguish the enclosed structure as primarily functional rather than physical.) The topmost or Display layer 50 is visible to the user. It consists of a "flat panel" display unit similar to those in common use today, for example, a liquid crystal or plasma display. The array of display pixels 52 shown in FIG. 4d extends nearly to the physical edge of tile 10 so as to minimize "dead" area at the junction of contiguous tiles. Because the display unit required is relatively small, it is relatively inexpensive. Further advances in flat-panel display technology can be expected to improve image resolution as well as reduce the display unit's cost.

The middle or Processor layer 60 contains one or more programmable processors and memory devices, typically microprocessors plus random access memory 62, although other components may also be used. These communicate with adjacent tiles via lateral signal transducers 65 using infrared, laser diodes, or other well known signaling technology. As shown in FIG. 1a the transducers communicate with adjacent tiles in all four directions, and from TAC boundaries to frame 18, as shown in FIG. 1c. Alternatively, contacts in the edges of the tiles can be used to provide electrical signal coupling to adjacent tiles. In the preferred embodiment, however, the use of electrical signal coupling is disfavored because connectors make insertion and removal of tiles difficult and because they are often troublesome in other ways.

The lowest or Service layer 70 provides for receiving or adapting electrical power from mounting plate 16 for use within the tile. Power can be provided through power strips 72 on the surface of the plate 16 as illustrated, with regularly spaced cellular positions for mounted tiles. Alternatively, a cable or other connector for delivering power can be connected to the back of each tile 10.

Each tile 10 may be connected to a power supply by another technique not requiring cellularly-spaced power strips. In one embodiment, tile 10 incorporates a multiplicity of electrical contact nodes on its lower surface, and metal strips alternating in power supply potential are located on the mounting surface of plate 16. The nodes are so arranged that they contact the power strips properly regardless of the position of the tile with respect to the strips. Another approach is to omit contacts altogether and use inductive or capacitive coupling between the tile and the plate to deliver power to the tile from power distribution circuits within the plate. Portable systems can include battery packs in each tile or include a special-purpose battery tile.

Typically, Service layer 70 also contains signaling transducers or other technology 75 to communicate information to and from the plate 16 through the panel-cell windows 22 in plate 16. Such signaling is discussed further below.

Each tile preferably includes detectors to detect pressure applied to its surface as from a finger. One way to sense such pressure is to include strain gauges 77 which detect the relative forces between the tile and mounting plate 16. Signals from three or more such force sensors are sufficient for the tile's program to determine which small sub-area on the surface of the tile is being touched.

In some implementations it may not be necessary to distinguish the Service layer from the Processor layer. The need for this will depend largely on the number and size of the integrated circuits used to implement the functionality of each these layers, as well as on the dimensions required to implement the Display layer 50.

The physical packaging for the Display layer 50, Processor layer 60, and Service layer 70 may be achieved by using any known techniques. In one embodiment the Processor layer 60 and the Service layer 70 each consist of multichip modules in which individual integrated circuits such as the processor chip and memory chips 62, as well as the transducer 65, are mounted on a silicon wafer which provides the circuit board interconnections among the various chips. This can be achieved using a flip chip technology, wire bonding, tape automated bonding or other well known technology. The two wafers can be bonded and connected together and to the pixel array device which implements Display layer 50, again using well known techniques. In this description we sometimes use "substrate" to refer to the combined physical structure within the tile and beneath the pixel array device.

Figure 5A:
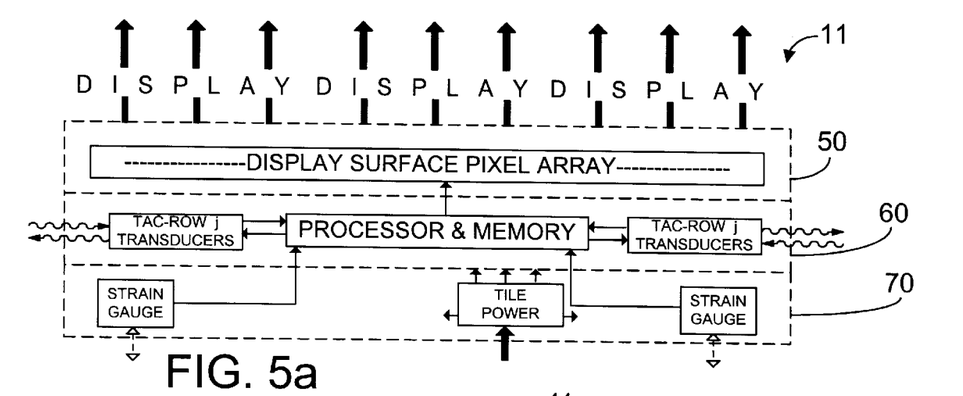
FIGS. 5a–5c illustrate variations of the functional structure of a tile.

FIGS. 5a–5d illustrate several variations in the functional structure of tile 10. FIG. 5a illustrates the functional structure of a TAC tile 11 in which the TAC-Cell transducers for communication with mounting plate 16 are omitted, but it is otherwise identical to the structure shown in FIG. 4a. Such a tile communicates only with its neighbors or with frame 18.

Figure 5B:
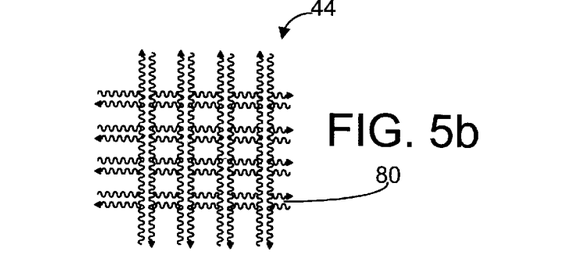
Figure 5C:
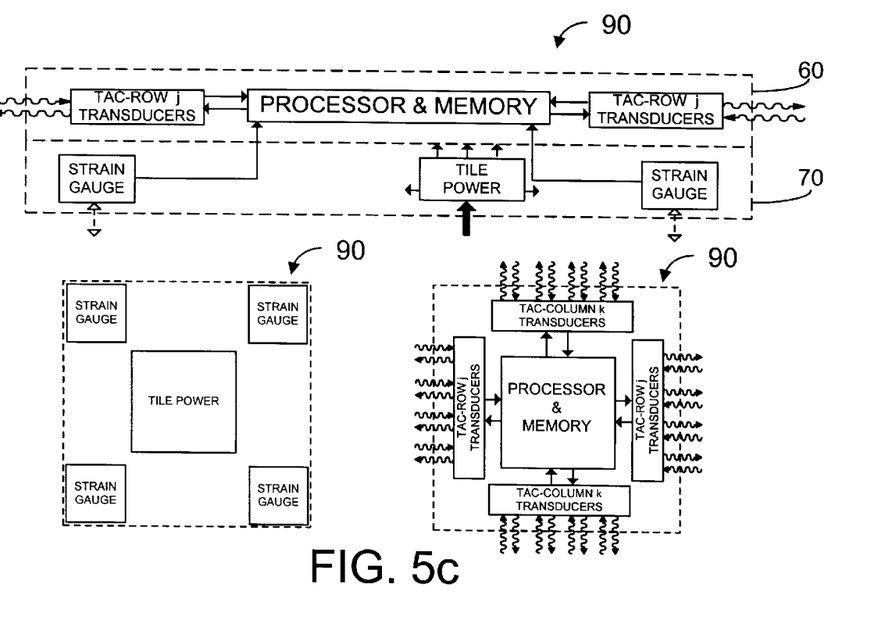

FIGS. 5b and 5c illustrate the functional structure of two types of filler tile 44, although other types of filler tile are also possible. FIG. 5b shows the simplest or "passive" type, which merely provides cell-crossing pathways 80 to allow communication signals to flow through adjacent passive tiles to and from the laterally nearest tiles having a Processor layer, or to and from frame 18. These paths can be implemented as light pipes, signal transducers, or wires, depending upon the TAC tile communication approach chosen.

FIG. 5c shows cross-sectional and plan views of the functional structure of a touch-sensitive filler tile. Except for the omission of Display layer 50, the depicted functional structure is identical to that shown in FIG. 5a. Touch-sensitive filler tiles can accommodate temporarily affixed labels on their upper surfaces to provide "on-off switches" or other "buttons" of various kinds whose purpose changes infrequently enough to render use of a display tile unnecessary.

Figure 6A:
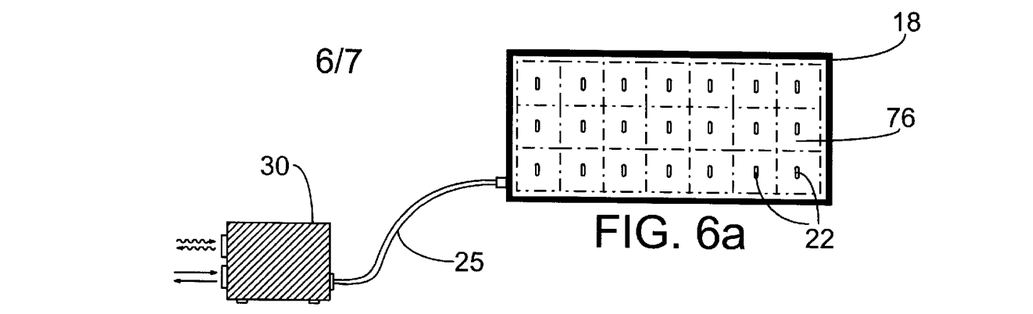
FIGS. 6a–6c illustrate an empty 3×7-cell panel and the signal transducer networks in its mounting-plate and frame.

FIG. 6a illustrates an empty panel and attached server that are in accord with the preferred embodiment. Although a 3×7-cell panel is shown in the figure, panel size will typically be determined by the number of tiles deemed suitable to a designated range of applications. Plate 16 of the panel, in addition to providing physical support and electrical power for mounted tile arrays as described above, also includes embedded signal transducers for communication through panel-cell transducer windows 22. Frame 18, as well, includes embedded signal transducers not shown in the figure.

Figure 6B:
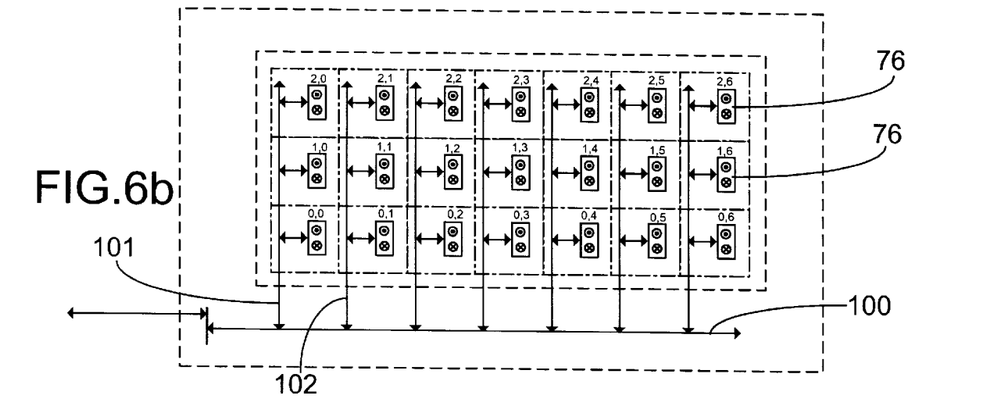

FIG. 6b illustrates the panel-cell signal transducers 76 which are embedded in mounting plate 16 of the 3×7-cell panel depicted in FIG. 6a. These transducers are interconnected by network 100, 101, 102, etc. to server 30 or to other external equipment. Information to and from these plate-to-tile transducers supplement information transmitted via the lateral signal transducers included within each tile. They can, for example, provide to any tile a signal such as "1, 2" regarding the tile's cellular location on the panel, in this case designating the cell at row 1, column 2 of the panel.

Figure 6C:
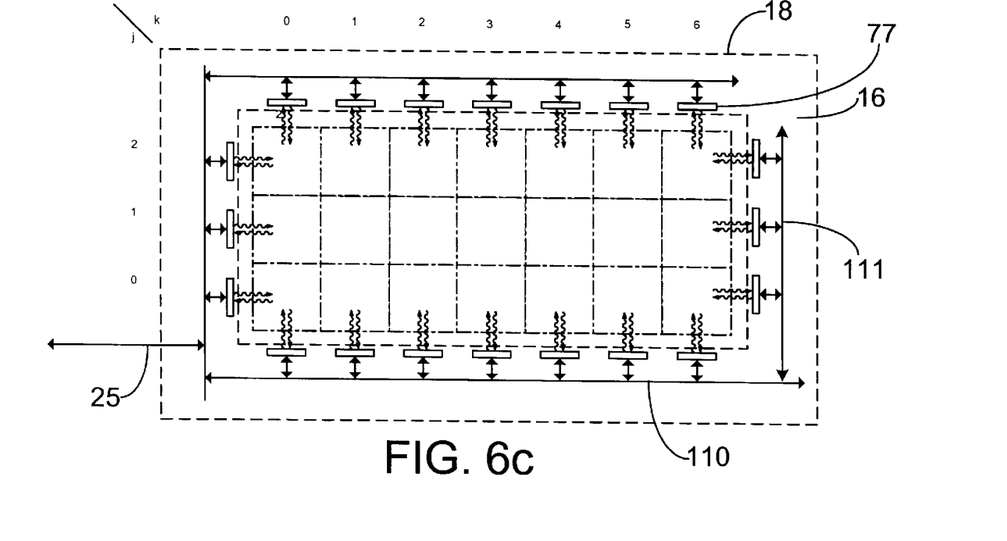

FIG. 6c illustrates the signal transducers 77 embedded in frame 18. These frame-to-tile transducers are interconnected by network 110, 111, etc., and thence, as with the panel's plate-to-tile transducers, to server 30 or to other external equipment by cable 25 or other communication technology.

In a panel-mounted embodiment as described herein, it may prove desirable to omit either the plate-to-tile transducers 76 of FIG. 6b or the frame-to-tile transducers 77 of FIG. 6b. The plate-to-tile transducer network of FIG. 6b adds cost to a panel in proportion to panel area, whereas the frame-to-tile transducers 77 of FIG. 6c. The plate-to-tile transducer network of FIG. 6c adds cost in proportion only to perimeter.

Figures 7A, 7B:
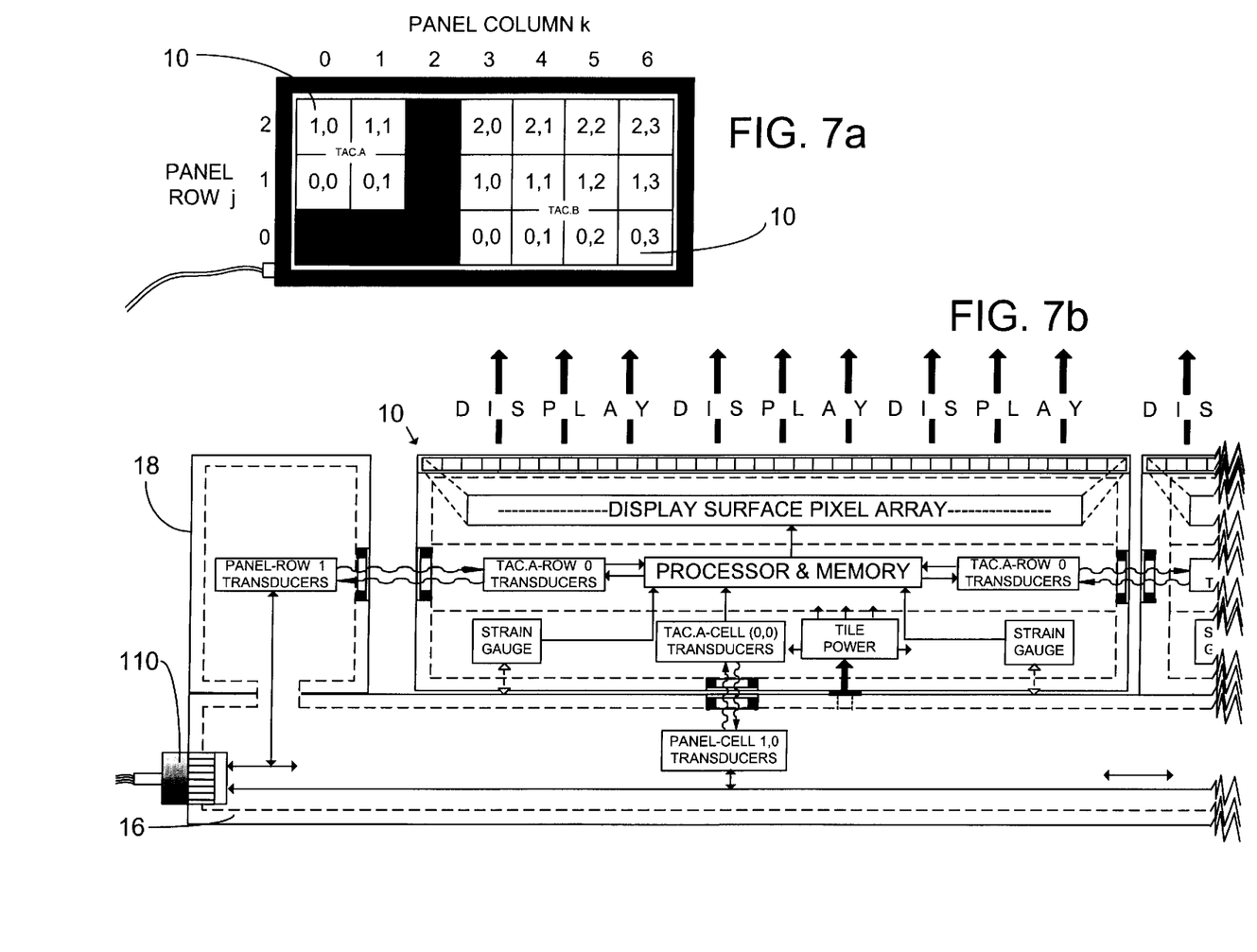
FIG. 7a illustrates the differing coordinate systems for two tile-array computers mounted on a 3×7 panel.
FIG. 7b illustrates a combined physical and functional cross section of tiles mounted on a panel.

FIG. 7a illustrates the notion that each mounted tile 10 can be located within the tile array of which it is a part. Such a location is then in reference to TAC coordinates, designated j, k. Alternatively, one can consider each tile's panel-cell position regardless of which TAC it may be a part. Such a location is then in reference to panel coordinates, designated j', k'. Reference to both coordinate systems is important to intercommunication functions and to coordinating the presentation of properly scaled pictures on various TAC display areas that differ in size and location; the program within each mounted tile 10 enables the tile to "deduce" from its neighbors the size and relative location of the TAC of which it is a part as well as its position within the mounted array.

FIG. 7b shows a combined physical and functional cross section of a portion of the panel shown in FIG. 7a when supporting a tile 10 mounted in Panel-cell (1, 0) as tile (0, 0) of TAC.A. The panel's raised frame 18 appears at the upper left in the figure, immediately above cable connector 110 (which connects to server 30 or to other external equipment as shown in FIG. 6a). Mounting plate 16 appears at the bottom of the figure. As described above, tile-to-tile, plate-to-tile, and frame-to-tile communication paths are provided through aligned windows in the matching surfaces enclosing tile 10, plate 16, and frame 18. (The gaps between the various physical elements depicted in the figure are exaggerated for clarity.)

The Tile Array Computer as described herein increases computing power in proportion to the display area. This make it ideal for distributed parallel computing of various kinds. For example, each tile in an array might handle, for its part of the picture, a portion of a task such as convolution or a hidden surface or other calculation relating to image processing. Either Single Instruction, Multiple Data (SIMD) or Multiple Instruction, Multiple Data (MIMD) computing modes may be employed.

Because the Tile Array Computer can have very small unit production cost, it may prove desirable to use small arrays of TAC-tiles for common office functions. For example, one or a few tiles might be devoted to reporting scheduled events for the day, tracking stock market quotes, or providing other frequently used information.

Because Tile Array Computers can also be made in very large sizes, they can be used for large scale, interactive design tasks. For example, a very large array of tiles covering as much as a full wall could present large drawings, circuit layouts, or other highly detailed information for manipulation by an individual user or for larger groups to observe. The great processing power of such an array can be harnessed to various simulations or to other calculation tasks.

The preceding has been a description of the preferred embodiment. It will be appreciated that numerous modifications can be made to the design of the tiles and other aspects described herein without departing from the invention. The scope of the invention is defined by the claims which follow.

What is claimed is:

1. A computer tile comprising:
   a display surface having elements thereon for displaying images, the display surface being affixed to a substrate having a predefined shape;
   a processor element coupled to the display, coupled to a memory element, and coupled to an information transducer element, each of the processor element and the memory element being mounted on the substrate to enable the processor element to communicate with the display surface to control the presentation of information thereon, wherein the transducer element is disposed to permit communications between the processor element and an external receiver or transmitter through a region of the tile other than the display surface; and
   at least one strain gauge disposed on the substrate in communication with the processor element.

2. A computer tile as in claim 1 further comprising a connector affixed to the substrate for being coupled to a source of electrical power.

3. A computer tile as in claim 1 wherein:
   the display is formed on a first layer of the substrate,
   the processor element, the memory element, and the information transducer element are coupled to a second layer of the substrate, and
   the first and the second layers of the substrate are affixed to each other.

4. A computer tile as in claim 1 wherein:
   the substrate has edges; and
   the transducer element is disposed to permit communications from the processor element to an external receiver by transmission through an opening in an edge of the substrate.

5. A computer tile as in claim 1 wherein the substrate has a polygon shape and a transducer element is disposed in each edge of the polygon.

6. A computer tile as in claim 5 wherein the polygon is a rectangle.

7. A computer tile as in claim 5 wherein the polygon is a rectangle.

8. At least two computer tiles disposed adjacent to each other, each comprising:
   a display surface having elements thereon for displaying images, the display surface being affixed to a substrate having a predefined shape;
   a processor element coupled to the display, coupled to a memory element, and coupled to an information transducer element, each of the processor element and the memory element being mounted on the substrate to enable the processor element to communicate with the display surface to control the presentation of information thereon, wherein the transducer element is disposed to permit communications from the processor element to an external receiver, the transducer providing information to the external receiver through a region of the layer other than the display surface; and
   at least one strain gauge disposed on the substrate in communication with the processor element, wherein
   the transducer of each of the computer tiles is disposed in proximity to an edge of the substrate to enable information from the first computer tile to be communicated to the second computer tile.

9. A computer comprising:
   a tile including:
      a display surface having elements thereon for displaying images, the display surface being affixed to a substrate having a predefined shape;
      a processor element coupled to the display, coupled to a memory element, and coupled to an information transducer element, each of the processor element and the memory element being mounted on the substrate to enable the processor element to communicate with the display suffice to control the presentation of information thereon, wherein the transducer element is disposed to permit communications from the processor element to an external receiver, the transducer providing information to the external receiver through a region of the layer other than the display surface; and
      at least one strain gauge disposed on the substrate in communication with the processor element; and
   a support for the tile including:
      a plate upon which the tile can be disposed, the plate including a further transducer element positioned to communicate with the transducer element in the tile; and
      an information connection to the support coupled to the further transducer element to enable the processor element in the tile to communicate through the transducer in the tile, the transducer in the support, and the information connection with a remote computer.

10. A computer as in claim 9 further comprising a connector affixed to the substrate for being coupled to a source of electrical power.

11. A computer as in claim 9 wherein:
    the display surface is formed on a first layer of the substrate,
    the processor element, the memory element, and the information transducer element are coupled to a second layer of the substrate, and
    the first and the second layers of the substrate are affixed to each other.

12. A computer as in claim 9 wherein:
    the substrate has edges; and
    the transducer element is disposed to permit communications from the processor element to an external receiver by transmission through an opening in an edge of the substrate.

13. A computer as in claim 12 wherein the substrate has a polygon shape and a transducer element is disposed in each edge of the polygon.

14. A computer comprising:
    a plurality of tiles, each including:
       a display surface having elements thereon for displaying images, the display surface being affixed to a substrate having a predefined shape; and
       a processor element coupled to the display, coupled to a memory element, and coupled to an information transducer element, each of the processor element and the memory element being mounted on the substrate to enable the processor element to communicate with the display surface to control the presentation of information thereon, wherein the transducer element is disposed to permit communications from the processor element to an external receiver, the transducer providing information to the external receiver through a region of the layer other than the display surface;
    a support for the tiles including:
       a plate upon which the tiles can be disposed, the plate including a further transducer elements positioned to communicate with the transducer elements in at least some of the tiles; and
       an information connection to the support coupled to the further transducer elements to enable the processor elements in the tiles to communicate through the transducers in the tile, the transducers in the support, and the information connection with a remote computer; and
    wherein the plurality of tiles are disposed on the support adjacent each other to enable the transducers in some of the tiles to communicate with the transducers in others of the tiles.

15. A computer as in claim 14 wherein the substrate has a polygon shape and a transducer element is disposed in each edge of the polygon.

16. A computer as in claim 15 wherein the polygon is a rectangle.

17. A computer as in claim 14 wherein:
    the support includes a frame;
    the frame includes the further transducer elements positioned to communicate with the transducer elements in those tiles disposed adjacent to the frame.

18. A computer as in claim 17 wherein:
    the plate includes additional transducer elements positioned to be disposed opposite a back surface of the tiles; and
    at least some of the tiles include transducer elements adjacent the back surface of the tile to communicate with the additional transducer elements positioned to be disposed opposite the back surface of the tiles.

19. A computer as in claim 14 wherein the plurality of tiles further includes at least one filler tile having a shape corresponding to the other tiles, but lacking at least one of the processing element and the display.

* * * * *